UNITED STATES PATENT OFFICE.

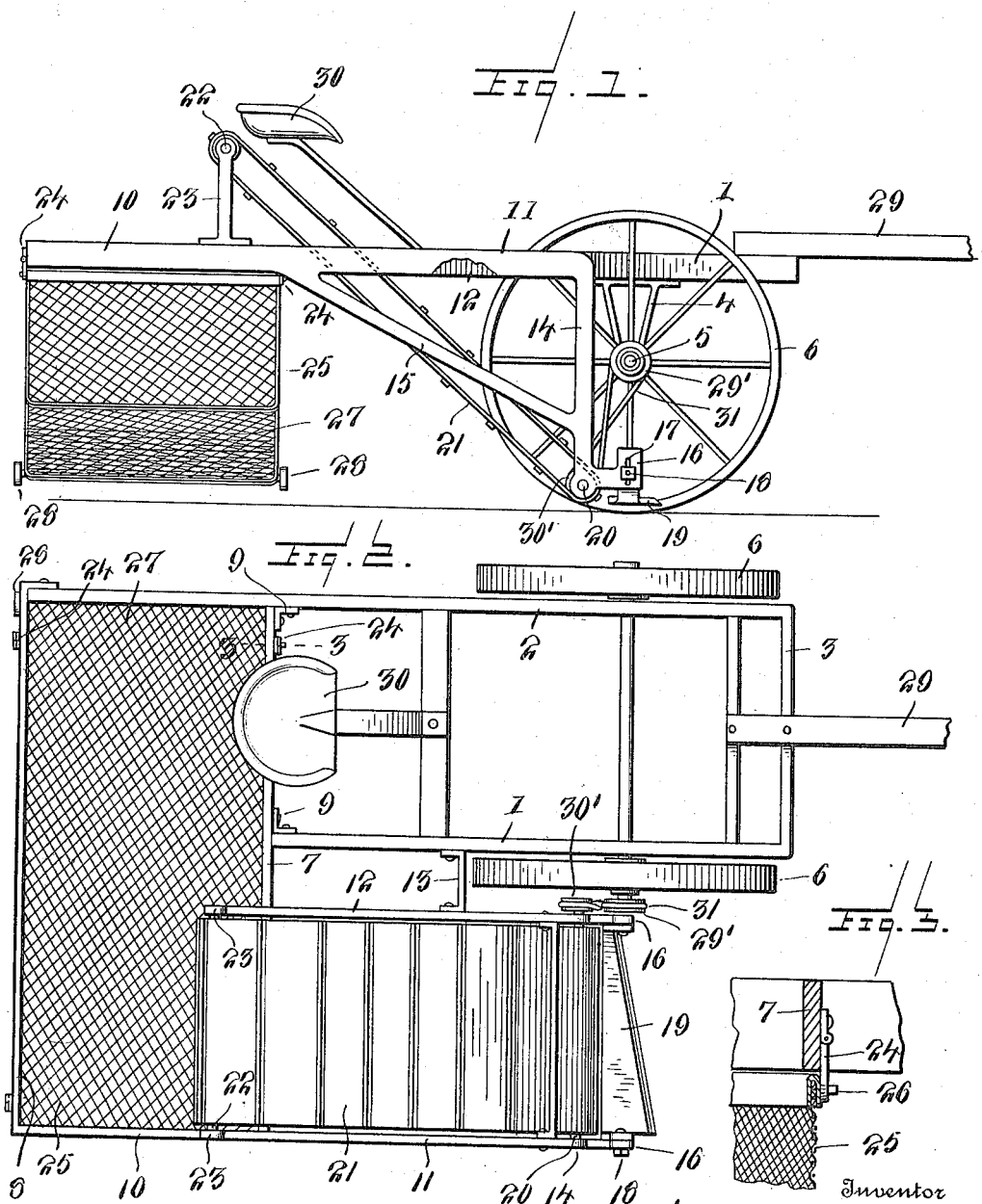

SAMUEL BASHINSKI, JR., OF DUBLIN, GEORGIA.

COTTON-HARVESTER.

1,220,931. Specification of Letters Patent. Patented Mar. 27, 1917.

Application filed March 2, 1912. Serial No. 681,097.

*To all whom it may concern:*

Be it known that I, SAMUEL BASHINSKI, Jr., a citizen of the United States, residing at Dublin, in the county of Laurens and State of Georgia, have invented new and useful Improvements in Cotton-Harvesters, of which the following is a specification.

This invention relates to cotton harvesters, and it has particular reference to an improved machine for cutting the stalks and for conveying the same into a receptacle carried by the machine and wherein they may be carried to a barn or other storage place where the picking of the bolls may be proceeded with at leisure.

The invention has for its object to produce a machine of the character described, of simple and improved construction, whereby the cotton stalks may be severed close to the ground and conveyed into a basket or receptacle which is supported detachably on the frame of the machine.

A further object of the invention is to provide simple effective means for supporting and adjusting the knife or cutting member to sever the stalks as close to the ground as may be desired.

A still further object of the invention is to provide a basket or receptacle of simple and improved construction which shall be of relatively great capacity, and which may be readily detached from the frame of the machine for the purpose of unloading.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Figure 1 is a side elevation of a machine constructed in accordance with the invention.

Fig. 2 is a top plan view of the same.

Fig. 3 is a sectional detail view taken on the line 3—3 in Fig. 2.

Corresponding parts in the several figures are denoted by like characters of reference.

The main frame of the improved machine includes side members 1 and 2 which are connected together at their front ends by a cross bar 3. Said side members are provided with brackets 4 affording bearings for the axle 5 having transporting wheels 6. One of the side members, 2, which for convenience will hereinafter be referred to as the "outer" side member in contradistinction to the "inner" side member 1, is somewhat longer than its mate, extending rearwardly thereof, as clearly seen in Fig. 2, for the attachment of the ends of two frame bars 7 and 8 which extend beyond the side member 1; the forward frame bar 7 being firmly connected with the rear end of the side member 1 by means of a corner clamp 9. The frame bars 7 and 8 constitute the front and rear sides of a separate frame which is connected with and extends laterally from the rear end of the main frame of the machine, one end of said laterally extending frame being formed by the rearwardly extended portion of the side member 2 of the main frame, while the opposite or outer end of said lateral frame is formed by a frame bar 10 which is terminally connected with the frame bars 7 and 8, but which extends forwardly of the forward frame bar 7 so as to form an arm 11 lying in parallel relation to the side members 1 and 2 of the main frame. A frame bar 12 lying in parallel relation to the arm 11 is connected with and spaced from the side member 1 by means of a bracket 13. The arm 11 and the frame bar 12 are provided at their front ends with downwardly extending legs, indicated at 14, each of said legs being reinforced by a brace 15, and said legs being provided at their lower ends with brackets 16 having vertical slots 17 for the passage of bolts 18, whereby the knife or cutting member 19 is mounted in position for vertical adjustment.

Bearings are provided at the lower ends of the legs 14 for a shaft 20 which supports the lower end of an endless carrier 21, the upper end of which is guided over a shaft 22 supported in suitable bearings 23.

The lateral frame, bounded by the frame bars 7 and 8, the bar 10 and the rear end of the side member 2, is equipped with means, such as hingedly supported eyes 24 for supporting a detachable receptacle, such as a box or basket 25, the sides of which are provided with laterally extending pins 26 adapted to be engaged by the eyes 24, it being understood, however, that supporting means of any convenient character may be used. The receptacle 25 has a bottom 27 which is downwardly inclined in the direction of the side member 1 of the main frame, and said receptacle is provided adjacent to the lower end of the bottom member 27 with small truck wheels 28 disposed at right angles to the supporting wheels 6 of the machine, enabling said receptacle when detached from the frame of the machine to be conveniently rolled over the barn floor to the point where the contents are to be dumped or discharged.

The main frame of the machine is equipped with a tongue 29 and with a seat 30 for the driver or operator.

After a cotton crop has been picked in the ordinary manner there usually remains a number of lately developed bolls, and bolls which are not conveniently accessible to the picker, and such bolls, which frequently aggregate a considerable quantity have been permitted to go to waste. By the present invention the stalks are severed and carried by the endless conveyer 21 into the receptacle 25 in which, when said receptacle has been filled, they are carried to the barn or storage place. The receptacle 25 is now disengaged or detached from the frame of the machine, after which it may be conveniently rolled to the point where it is desired to dump and discharge the contents. The receptacle is now restored to its initial position on the frame of the machine, after which the operation may be repeated.

Motion is transmitted to the endless conveyer 21 from one of the transporting wheels 6 or from the axle 5 by means of pulleys 29', 30' and a band 31, or in any other simple and convenient manner.

Having thus described the invention, what is claimed as new, is:—

A wheel supported frame structure having side members of unequal lengths coacting to provide a support for an elongated supporting frame at the rear end of said frame structure, said supporting frame extending beyond and at right-angles to the shorter of said side members, a wheeled receptacle having an inclined bottom arranged beneath and coextensive in width and length with said supporting frame, and means on the sides of said receptacle and supporting frame whereby said receptacle is detachably connected with the supporting frame to be normally supported thereby above and free from contact with the ground, in combination with cutting means and conveying means arranged in advance of the extending portion of said supporting frame and having connection therewith and with one of said side bars, said conveying means overhanging the extending portion of said supporting frame to deliver into the receptacle carried thereby material cut by the cutting means.

In testimony whereof I affix my signature in presence of two witnesses.

SAMUEL BASHINSKI, Jr.

Witnesses:
WM. BAZZER,
BENNETT S. JONES.

Copies of this patent may be obtained for five cents each, by addressing the "Commissioner of Patents, Washington, D. C."